US011650809B2

(12) United States Patent
Rangarao et al.

(10) Patent No.: US 11,650,809 B2
(45) Date of Patent: May 16, 2023

(54) AUTONOMOUS AND OPTIMIZED CLONING, REINSTATING, AND ARCHIVING OF AN APPLICATION IN A CONTAINERIZED PLATFORM

(71) Applicant: INTERNATIONAL BUSINESS MACHINES CORPORATION, Armonk, NY (US)

(72) Inventors: Deepak Rangarao, Pleasanton, CA (US); Daniel Kikuchi, Raleigh, NC (US); Kevin McAndrews Collins, Raleigh, NC (US); Duane Almeter, Suttons Bay, MI (US); Rajesh Kartha, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 183 days.

(21) Appl. No.: 17/304,126

(22) Filed: Jun. 15, 2021

(65) Prior Publication Data

US 2022/0398092 A1    Dec. 15, 2022

(51) Int. Cl.
*G06F 8/70* (2018.01)
*G06N 20/00* (2019.01)
(Continued)

(52) U.S. Cl.
CPC .............. *G06F 8/70* (2013.01); *G06F 9/4881* (2013.01); *G06N 5/04* (2013.01); *G06N 20/00* (2019.01)

(58) Field of Classification Search
CPC ......... G06F 8/70; G06F 9/4881; G06N 20/00; G06N 5/04
(Continued)

(56) References Cited

U.S. PATENT DOCUMENTS 7,627,873 B1 * 12/2009 Pathak .................... G06F 9/545
                                                                          719/321
8,151,263 B1    4/2012 Venkitachalam
(Continued)

FOREIGN PATENT DOCUMENTS

WO    2020232888 A1    11/2020

OTHER PUBLICATIONS

Juergens, Elmar, et al. "Can clone detection support quality assessments of requirements specifications?." Proceedings of the 32nd ACM/IEEE International Conference on Software Engineering—vol. 2. 2010.pp.79-88 (Year: 2010).*
(Continued)

*Primary Examiner* — Satish Rampuria
(74) *Attorney, Agent, or Firm* — Schmeiser, Olsen & Watts, LLP; Aaron Pontikos

(57) ABSTRACT

An approach is provided for autonomous and optimal cloning, reinstating, and archiving of a containerized application. Application metadata is obtained from a catalog. Cloning rules specifying cloning an application are obtained. Application components are selected for cloning and the cloning is determined to be compliant with the cloning rules. The application components are cloned and data for the clone is saved to a clone repository. The catalog is updated with specifications of the cloned application components. Reinstating rules specifying reinstating a clone of the application are obtained. Reinstating the clone is determined to be compliant with the reinstating rules. The catalog is updated with specifications of the reinstated clone. In one embodiment, the catalog is updated with inferred associations among applications and identified rules associated with the application, where the inferred associations and identified rules are generated by a trained machine learning-based classifier.

22 Claims, 9 Drawing Sheets

(51) Int. Cl.
*G06F 9/48* (2006.01)
*G06N 5/04* (2023.01)

(58) Field of Classification Search
USPC .......................... 717/120, 122, 126, 136, 168
See application file for complete search history.

(56) References Cited

U.S. PATENT DOCUMENTS

| | | | |
|---|---|---|---|
| 8,756,598 | B1 | 6/2014 | Costea |
| 8,856,785 | B2 | 10/2014 | Gimpl |
| 8,868,503 | B1* | 10/2014 | Ravichandran ....... G06F 16/128 707/649 |
| 9,170,831 | B2 | 10/2015 | Robinson |
| 9,652,273 | B2 | 5/2017 | Davis |
| 10,223,361 | B2 | 3/2019 | Srinivasan |
| 10,474,489 | B2 | 11/2019 | Dong |
| 10,514,947 | B2 | 12/2019 | Kondo |
| 11,360,689 | B1* | 6/2022 | Grunwald ............. G06F 3/0616 |
| 2010/0306337 | A1* | 12/2010 | DeHaan .................... G06F 8/63 709/213 |
| 2012/0246640 | A1* | 9/2012 | Marshall ............. G06F 9/45558 718/1 |
| 2015/0365301 | A1 | 12/2015 | Chatterjee |
| 2021/0109823 | A1 | 4/2021 | King |
| 2021/0149769 | A1 | 5/2021 | Balcha |
| 2021/0157686 | A1 | 5/2021 | Rhodes |
| 2022/0100615 | A1* | 3/2022 | Jumle ................. G06F 11/1464 |
| 2022/0245237 | A1* | 8/2022 | Briongos ............... G06N 20/00 |
| 2022/0308849 | A1* | 9/2022 | Kumar ................ G06F 11/1469 |

OTHER PUBLICATIONS

Svajlenko, Jeffrey, et al. "Towards a big data curated benchmark of inter-project code clones." 2014 IEEE International Conference on Software Maintenance and Evolution. IEEE, 2014.pp. 476-480 (Year: 2014).*

Le Goues, Claire, and Westley Weimer. "Measuring code quality to improve specification mining." IEEE Transactions on Software Engineering 38.1 (2011): pp. 175-190. (Year: 2011).*

Mell, Peter et al.; "The NIST Definition of Cloud Computing;" National Institute of Standards and Technology; Special Publication 800-145; Sep. 2011; 7 pages.

PCT International Search Report, Applicant's file reference: P202008273, dated Sep. 21, 2022, International application No. PCT/EP2022/064295, International Filing date: May 25, 2022, 23 pages.

* cited by examiner

AUTONOMOUS AND OPTIMIZED CLONING, REINSTATING, AND ARCHIVING OF AN APPLICATION IN A CONTAINERIZED PLATFORM

BACKGROUND

The present invention relates to backing up and restoring software applications, and more particularly to optimizing cloning, reinstating, and archiving of containerized applications.

In traditional information technology (IT) environments, different applications and database teams maintain their own infrastructures, which include servers, storage, cooling, data center space, software-based virtualization technology, etc. These infrastructures are often under-utilized and require separate teams to design and maintain. Containers provide a lightweight alternative to virtual machines that include an operating system, applications, and application dependencies. By using containers, an application can be efficiently packaged along with its dependencies, thereby streamlining workload scheduling. Containerized platforms use a microservices architecture for cost efficiency, flexibility, and scale, where servers are pooled together and a software-defined scheduler handles workload requests for resources and schedules the workload in cases in which capacity is available. Containers and container platforms (also referred to herein as containerized platforms) were originally used for stateless applications, where no data is stored, but are increasingly used for stateful applications that have a persistence layer. The container platforms are designed to operate on commodity hardware and use application replicas (i.e., multiple copies of an application or service running on different servers or nodes in a cluster) to provide high availability by which an application that fails on a certain server due to hardware failure or any other reason is automatically routed to another instance of the application on a different server.

Known backup and restore approaches are dependent on underlying infrastructure support for a particular storage mechanism. Furthermore, known backup and restore approaches lack integration with governance artifacts and autonomous compliance to an established governance framework.

Known virtual machine cloning approaches require the cloning of an entire virtual machine that includes an operating system, runtime environment, and application components, thereby preventing the cloning from being able to respond to regulatory questions related to data handling. Since the known virtual cloning approaches virtualize at the hardware level, each virtual machine requires a separate operating system, thereby requiring a significant amount of additional memory and storage resources and limiting portability and flexibility across different cloud environments.

Accordingly, there is a need for a lightweight, portable, autonomous, and policy-driven cloning and reinstating approach that consistently clones and reinstates related components of cloud-native containerized applications, application metadata, application state, and underlying application data, where the approach is infrastructure-independent and ensures compliance with a governance framework established by an enterprise.

SUMMARY

In one embodiment, the present invention provides a computer system. The computer system includes a central processing unit (CPU); a memory coupled to the CPU; and one or more computer readable storage media coupled to the CPU. The one or more computer readable storage media collectively contain instructions that are executed by the CPU via the memory to implement a method of cloning, reinstating, and archiving an application. The method includes the computer system identifying a triggering of a cloning of an application in a cloud-native containerized platform. The method further includes in response to the identifying the triggering of the cloning of the application, the computer system obtaining application metadata from a catalog. The application metadata defines components of the application. The method further includes based on the application metadata, the computer system identifying and obtaining rules specifying the cloning of the application. The method further includes based on the rules, the computer system selecting multiple application components included in a plurality of components of the application. The method further includes the computer system determining that a cloning of the multiple application components is compliant with the rules. The method further includes in response to the selecting the multiple application components and the determining that the cloning of the multiple application components is compliant with the rules, the computer system cloning the multiple application components. The method further includes the computer system saving data in the cloned multiple application components to a clone repository. The method further includes the computer system updating the catalog with specifications of the cloned multiple application components.

The aforementioned embodiment provides a lightweight, portable, autonomous, and policy-driven cloning and reinstating approach that consistently clones related components of cloud-native containerized applications, application metadata, application state, and underlying application data, where the cloning approach is infrastructure-independent and ensures compliance with a governance framework established by an enterprise. The aforementioned embodiment further provides an ability to clone stateful applications regardless of the underlying storage mechanism. The aforementioned embodiment provides an ability to save application clones in a desired clone repository that can be mounted as a persistence volume in the containerized platform. The aforementioned embodiment enables disaster recovery of applications in the containerized platform and enables blue/green testing.

In one optional aspect of the present invention, the method further includes the computer system quiescing the application. The method further includes the computer system scheduling cloning jobs in parallel on the cloud-native containerized platform. The cloning of the multiple application components includes exporting data from the multiple application components to the clone repository by employing the cloning jobs in parallel subsequent to the quiescing of the application. The aforementioned aspect of the present invention advantageously provides an optimized and time-efficient cloning approach by using parallelization in the cloning of application components.

In another optional aspect of the present invention, the method further includes the computer system identifying a triggering of a reinstatement of a clone of the application. The method further includes in response to the identifying the triggering of the reinstatement, the computer system obtaining the application metadata from the catalog. The method further includes based on the application metadata, the computer system identifying and obtaining reinstate rules specifying the reinstatement of the clone of the application. The method further includes the computer system determining that the reinstatement of the clone of the application is compliant with the reinstate rules. The method further includes in response to the determining that the reinstatement of the clone of the application is compliant with the reinstate rules, the computer system reinstating the clone of the application. The method further includes the computer system updating the catalog with specifications of the reinstated clone of the application. The aforementioned aspect of the present invention advantageously provides a flexible and efficient reinstatement approach for containerized applications that is infrastructure-independent.

In another optional aspect of the present invention, the method further includes the computer system scheduling reinstating jobs in parallel on the cloud-native containerized platform. The reinstating of the clone of the application includes importing data from the clone repository for the reinstatement of the clone of the application by employing the reinstating jobs in parallel. The aforementioned aspect of the present invention advantageously provides an optimized and time-efficient reinstatement approach by using parallelization in the reinstating of application components.

In another embodiment, the present invention provides a computer system. The computer system includes a central processing unit (CPU); a memory coupled to the CPU; and one or more computer readable storage media coupled to the CPU. The one or more computer readable storage media collectively contain instructions that are executed by the CPU via the memory to implement a method of cloning, reinstating, and archiving an application. The method includes the computer system collecting information from a plurality of applications in a cloud-native containerized platform. The plurality of applications includes microservices. The information is collected from a data dictionary, metadata of the microservices, metadata of namespaces associated with the microservices, and data about interactions among the microservices. The method further includes based on the collected information, the computer system training a machine learning-based cognitive classifier by employing a classification algorithm. The method further includes subsequent to the training the machine learning-based cognitive classifier, the computer system extracting application metadata defining components of an application and dependencies among the components in the cloud-native containerized platform. The method further includes the computer system determining that the extracted application metadata does not exist in a governance catalog. The method further includes in response to the determining that the extracted application metadata does not exist in the governance catalog, the computer system inferring one or more associations between the application and one or more other applications included in the plurality of applications by employing the trained machine learning-based cognitive classifier on the extracted application metadata. The method further includes the computer system receiving from a human subject matter expert a validation of an association between the application and another application included in the plurality of applications. The association is included in the inferred one or more associations. The method further includes based on the validation of the association, the computer system updating the governance catalog with the extracted application metadata. The method further includes subsequent to the updating the governance catalog, the computer system extracting second application metadata defining components of a second application and dependencies among the components of the second application in the cloud-native containerized platform. The method further includes the computer system determining that the extracted second application metadata exists in the governance catalog. The method further includes in response to the determining that the second extracted application metadata exists in the governance catalog, the computer system identifying policies and rules associated with the second application by employing the trained machine learning-based cognitive classifier. The method further includes the computer system updating the governance catalog with the identified policies and rules as being associated with the second application. The method further includes based on the updated governance catalog, the computer system cloning the components of the second application or reinstating a clone of the second application.

The aforementioned embodiment provides an autonomous approach to cloning, reinstating, and archiving of applications that uses a governance-infused framework and satisfies retention policies of enterprises and regulatory requirements for sensitive data that is cloned, where the approach controls who is permitted to trigger the cloning and reinstatement of the application and ensures required parties are notified about the cloning and reinstatement. Further, the aforementioned embodiment employs machine learning-based classification of application components to business subject areas and logical areas, thereby allowing cloning and reinstating approaches described herein to be based on policies and rules specific to the business subject and logical areas.

Respective computer program products and methods corresponding to the above-summarized computer systems are also described herein. The advantages discussed above relative to the computer systems also apply to the respective computer program products and methods.

DETAILED DESCRIPTION

Overview

Figure 1:
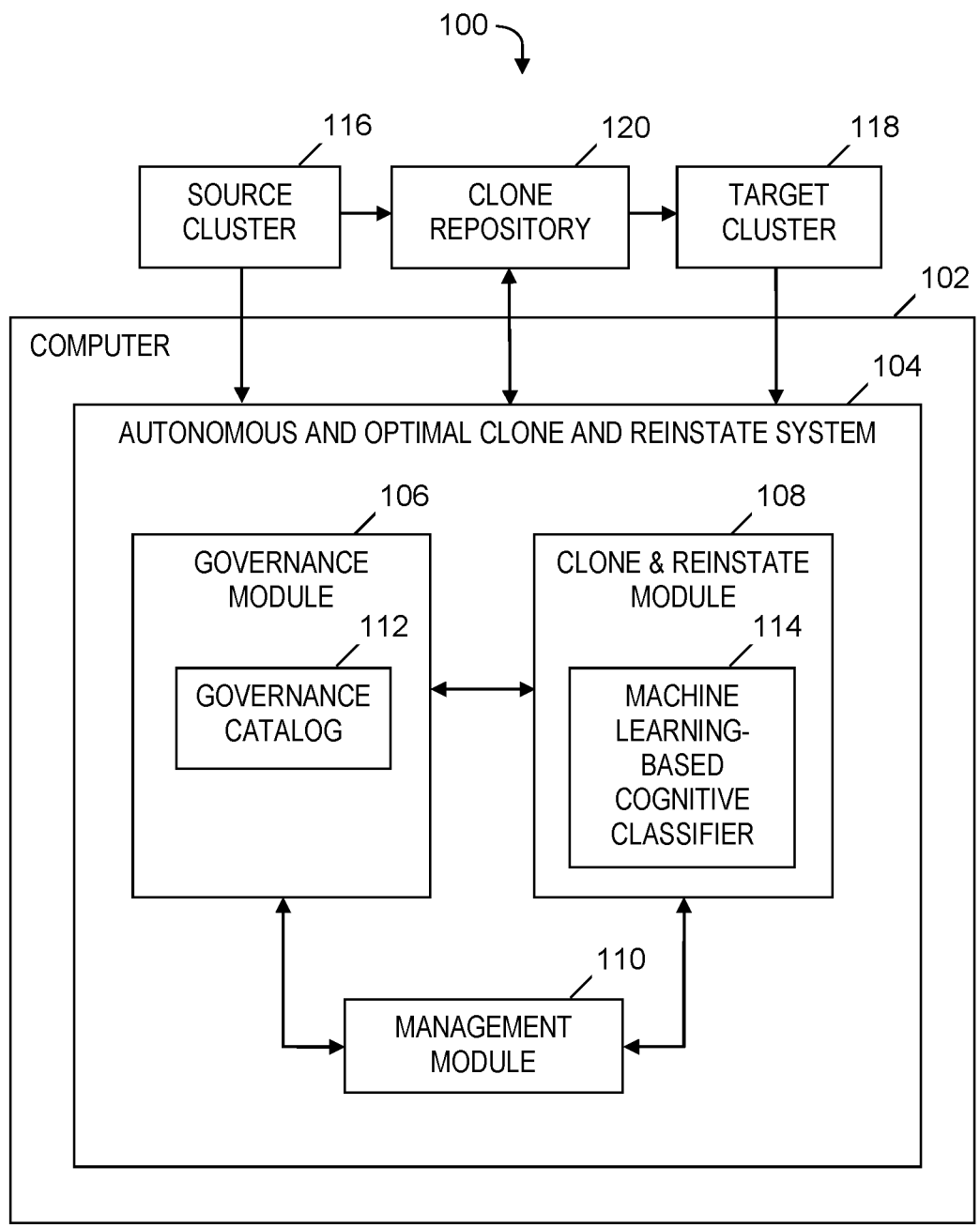
FIG. 1 is a block diagram of a system for cloning, reinstating, and archiving an application in a containerized platform, in accordance with embodiments of the present invention.

Most enterprise applications host customer and/or product sensitive data. Enterprises employ known cloning and reinstating approaches that fail to establish a governance framework to manage information assets and fail to provide an automated system that clones and archives applications in accordance with corporate retention policies and regulatory requirements.

Microservices based applications and services that run on containerized platforms have holistically multiple dependencies on other microservices. Containerized platforms also support a wide range of underlying storage infrastructure technologies used, as the storage layer is abstracted from the microservices. Known cloning and reinstating approaches fail to consider microservices dependencies and fail to provide a storage layer agnostic solution. Furthermore, known cloning and reinstating approaches fail to accurately capture the application state given the aforementioned dependencies, thereby failing to provide application integrity.

Traditional backup and restore methods fail to provide a cloning approach that employs an autonomous and governance-infused mechanism to create clones. Known approaches to cloning lack an ability to consistently clone the related components of an application, application metadata, application state, and the underlying application data in a cloud-native architecture, where the application is broken into multiple microservices with an underlying distributed storage architecture for persistent data services.

Organizations are taking a multi-cloud approach in which application workloads are shifted from on-premises to the public cloud and even from one cloud service provider to another. Known clone and reinstate approaches lack the flexibility and infrastructure independence required by the multi-cloud approach.

Existing backup and restore techniques that use storage level snapshot capabilities depend on support for a particular infrastructure (e.g., a particular storage platform or an underlying storage technology plugins), thereby making these techniques inflexible. Furthermore, existing backup and restore techniques are limited because they lack integration with governance artifacts and autonomous compliance to an established governance framework. One or more existing backup and restore techniques have a dependency on Container Storage Interface (CSI) drivers and specifications.

Embodiments of the present invention address the aforementioned unique challenges of existing backup and restore solutions by providing an infrastructure-independent clone, reinstate, and archiving process, which is enabled with governance-driven controls that ensure only authorized individual(s) and/or authorized group(s) are permitted to request a clone to be reinstated. The governance-driven controls manage reinstatement with no data loss and provides an efficient reinstatement of clones to an appropriate target infrastructure.

Embodiments of the present invention provide a governance-infused, autonomous clone and reinstate capability that supports multi-cloud and hybrid cloud environments. Embodiments of the present invention provide a governance-infused framework for application retention through cloning and for a reinstatement of clones. Embodiments of the present invention provide a storage-independent and a CSI-independent clone and reinstate technique.

As used herein, "cognitive" is defined as pertaining to a system or process that provides artificial intelligence capabilities that perform machine learning tasks. As used herein, "cognitive" and its variants are not to be construed as being or pertaining to mental processes or concepts performed in the human mind.

System for Autonomous and Optimized Cloning, Reinstating, and Archiving of an Application in a Containerized Platform FIG. 1 is a block diagram of a system 100 for cloning, reinstating, and archiving an application in a containerized platform, in accordance with embodiments of the present invention. System 100 includes a computer 102 that includes a software-based autonomous and optimal clone and reinstate system 104 which includes a governance module 106, a clone & reinstate module 108 and a management module 110.

Governance module 106 sources application metadata and organizes application metadata in a governance taxonomy. Governance module 106 includes a governance catalog 112 (i.e., a catalog of metadata) that includes business metadata and technical metadata. The business metadata is organized in a taxonomy of subject areas and logical areas. The technical metadata specifies all aspects of metadata of an application including, but not limited to (i) an identifier of the application, (ii) name of the application, (iii) application label, (iv) replication factor, (v) storage class, (vi) retention information (e.g., details pertaining to retention period, timeframe to move to cold storage, etc.), (vii) identifier(s) of related application(s), and (vii) date and time of most recent clone.

Governance module 106 provides functions that include, but are not limited to (i) onboarding application metadata to governance catalog 112, (ii) associating applications to subject areas and logical areas, (iii) adding metadata of related application(s), (iv) establishing governance rules and policies, and (v) checking for compliance with governance rules and policies.

Clone & reinstate module 108 performs tasks related to scheduling and functioning of clone and reinstate operations. Clone & reinstate module 108 extracts a current state (i.e., number of replicas of individual microservices) of an application being cloned, extracts object specifications for different containerized platform objects (e.g., deployments, statefulsets, secrets, roles, role bindings, etc.), schedules and triggers parallelized application data export jobs on the containerized platform for cloning, and schedules and triggers parallelized application data import jobs on the containerized platform for reinstatement of a cloned application. For the scheduling of the parallelized application data export and import jobs, clone & reinstate module 108 employs one work stream for each of the persistence volumes used by the application. Clone & reinstate module 108 also ensures proper sequencing of sub-tasks, so all application object dependencies are created prior to creating the application objects. Other functions performed by clone & reinstate module 108 include quiescing the application and scaling up of individual application components.

Clone & reinstate module 108 includes a machine learning-based cognitive classifier 114, which generates a classification model based on information about assets of an enterprise, including inter-relationships among applications and clones of the enterprise, and information about the cloud-native containerized platform. The cloud-native containerized platform is also referred to herein simply as the containerized platform.

Given a clone that is not included in the governance catalog 112, clone & reinstate module 108 employs the classification model to infer associations between the given clone and the application that was cloned and between the given clone and other applications. Further, clone & reinstate module 108 employs the classification model to generate confidence scores indicating how likely the inferred associations are actual associations between the given clone and the aforementioned applications. Moreover, given a clone that is included in governance catalog 112, clone & reinstate module 108 employs the classification model to recommend enterprise-level rules and policies that are associated with the clone.

Clone & reinstate module 108 clones an application from a source cluster 116 (i.e., any cluster in the containerized platform). Clone & reinstate module 108 reinstates a previously cloned application to a target cluster 118. Clone & reinstate module 108 performs cloning and reinstating to a clone repository 120, which is not limited to a particular storage mechanism (i.e., the cloning and reinstating are storage independent).

In one embodiment, source cluster 116 employs container images in a centralized image registry for cloning components of an application, while clone repository 120 can reinstate clones to multiple container images in multiple local cluster registries in multiple target clusters.

Management module 110 generates reports about clone and reinstatement activity and scheduling of regular clone jobs for governance-driven archiving. Functions of management module 110 include, but are not limited to (i) access management, (ii) provisioning of the clone repository 120, (iii) continuous monitoring of a governance framework provided by governance module 106 to determine scheduling of cloning and/or reinstatement, (iv) continuous monitoring for completion of scheduled cloning and reinstate jobs, and (v) compliance reporting for regulatory requirements.

The functionality of the components shown in FIG. 1 is described in more detail in the discussion of FIG. 2, FIG. 3, FIG. 4, FIG. 5, FIG. 6, and FIG. 7 presented below.

Figure 2:
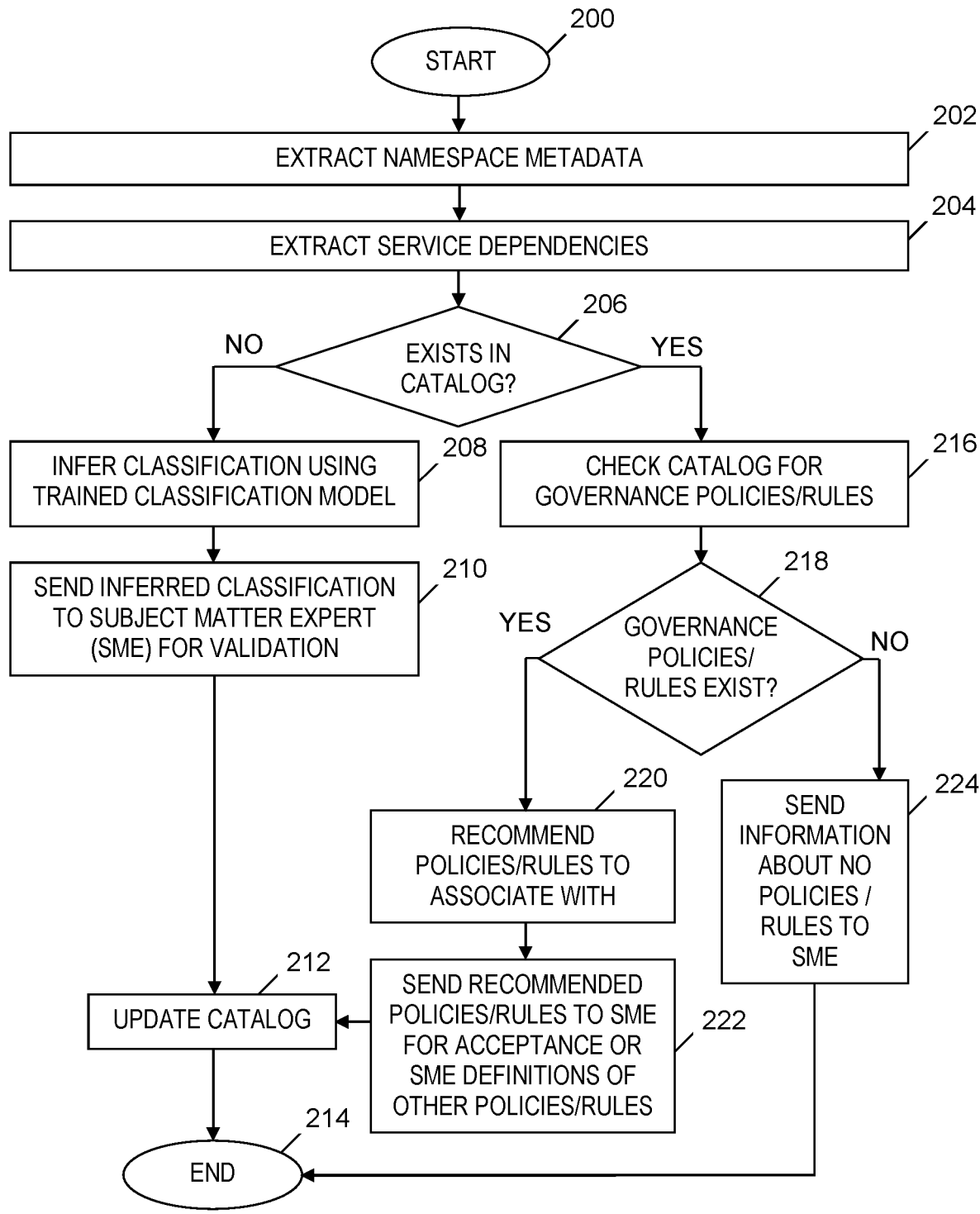
FIG. 2 is a flowchart of a process of collecting metadata for an application in a containerized platform, where the process is implemented in the system of FIG. 1, in accordance with embodiments of the present invention.

Processes for Autonomous and Optimized Cloning, Reinstating, and Archiving of an Application in a Containerized Platform FIG. 2 is a flowchart of a process of collecting metadata for an application in a containerized platform, where the process is implemented in the system of FIG. 1, in accordance with embodiments of the present invention. The process of FIG. 2 begins at a start node 200. In step 202, autonomous and optimal clone and reinstate system 104 (see FIG. 1) extracts project or namespace metadata of a cloud-native containerized application. As used herein, a cloud-native containerized application is an application running on a cloud-native containerized platform. Hereinafter in the discussion of FIG. 2, the cloud-native containerized application is also referred to simply as "the application."

In step 204, autonomous and optimal clone and reinstate system 104 (see FIG. 1) extracts service dependencies, which are inter-dependencies among components (i.e., microservices) of the application.

In step 206, autonomous and optimal clone and reinstate system 104 (see FIG. 1) determines whether the application exists in governance catalog 112 (see FIG. 1) by searching governance catalog 112 (see FIG. 1) for the metadata and dependencies extracted in steps 202 and 204. If the search in step 206 does not find the aforementioned metadata and dependencies, then autonomous and optimal clone and reinstate system 104 (see FIG. 1) determines that the application is not in governance catalog 112 (see FIG. 1), the No branch of step 206 is followed, and step 208 is performed.

In step 208 and in response to the determination in step 206 that the application does not exist in governance catalog 112 (see FIG. 1), machine learning-based cognitive classifier 114 (see FIG. 1) infers a classification of the application using the classification model together with the metadata and dependencies extracted in steps 202 and 204. The classification inferred in step 208 includes association(s) between the application and one or more other applications. In step 208, machine learning-based cognitive classifier 114 (see FIG. 1) also generates confidence score(s) indicating how likely the inferred classification indicates actual association(s) between the application and the one or more other applications. In one embodiment, machine learning-based cognitive classifier 114 (see FIG. 1) performs step 208 after being trained by using components included in FIG. 5, as described below.

In step 210, autonomous and optimal clone and reinstate system 104 (see FIG. 1) sends the classification inferred in step 208 to a subject matter expert (SME). The SME validates the association(s) between the application and the one or more other applications.

In step 212 and based on the validation of the association(s) by the SME, autonomous and optimal clone and reinstate system 104 (see FIG. 1) updates governance catalog 112 (see FIG. 1) with the metadata and dependencies extracted in steps 202 and 204, along with the association(s) validated by the SME.

Following step 212, the process of FIG. 2 ends at an end node 214.

Returning to step 206, if the search finds the metadata and dependencies extracted in steps 202 and 204, then autonomous and optimal clone and reinstate system 104 (see FIG. 1) determines that the application is in governance catalog 112 (see FIG. 1), the Yes branch of step 206 is followed, and step 216 is performed.

In step 216, autonomous and optimal clone and reinstate system 104 (see FIG. 1) checks governance catalog 112 (see FIG. 1) for an existence of governance policies and rules associated with the application, where the policies and rules are specified in a governance framework for an enterprise. In one embodiment, the policies and rules are based on regulatory requirements.

In step 218, autonomous and optimal clone and reinstate system 104 (see FIG. 1) determines whether the governance policies and rules exist in governance catalog 112 (see FIG. 1) for the application as a result of the check in step 216. If autonomous and optimal clone and reinstate system 104 (see FIG. 1) determines in step 218 that the governance policies and rules exist for the application, then the Yes branch of step 218 is followed and step 220 is performed.

In step 220, machine learning-based cognitive classifier 114 (see FIG. 1) recommends rules and policies that are associated with the application, where the recommendation is generated by employing the classification model. In one embodiment, machine learning-based cognitive classifier 114 (see FIG. 1) performs step 220 after being trained by using components included in FIG. 5, as described below.

In step 222, machine learning-based cognitive classifier 114 (see FIG. 1) sends the recommended rules and policies to the SME, who accepts one or more of the recommended rules and policies or defines one or more other rules and policies for the application.

In step 212 which follows step 222, autonomous and optimal clone and reinstate system 104 (see FIG. 1) updates governance catalog 112 (see FIG. 1) with an association between the application and the rules and policies accepted or defined by the SME. Again, following step 212, the process of FIG. 2 ends at the end node 214.

In one embodiment, after the update of governance catalog 112 (see FIG. 1) in step 212, autonomous and optimal clone and reinstate system 104 (see FIG. 1) clones components of another application in the cloud-native containerized platform using the process of FIG. 3, as described below, or reinstates a clone of another application in the cloud-native containerized platform using the process of FIG. 4, as described below.

Returning to step 218, if autonomous and optimal clone and reinstate system 104 (see FIG. 1) determines that governance policies and rules do not exist in governance catalog 112 (see FIG. 1) for the application, then the No branch of step 218 is followed and step 224 is performed.

In step 224, autonomous and optimal clone and reinstate system 104 (see FIG. 1) sends information to the SME about no policies and rules existing in governance catalog 112 (see FIG. 1). The SME can accept that there are no policies and rules existing in governance catalog 112 (see FIG. 1) or the SME can work with the enterprise to define policies and rules. Following step 224, the process of FIG. 2 ends at the end node 214.

Figure 3:
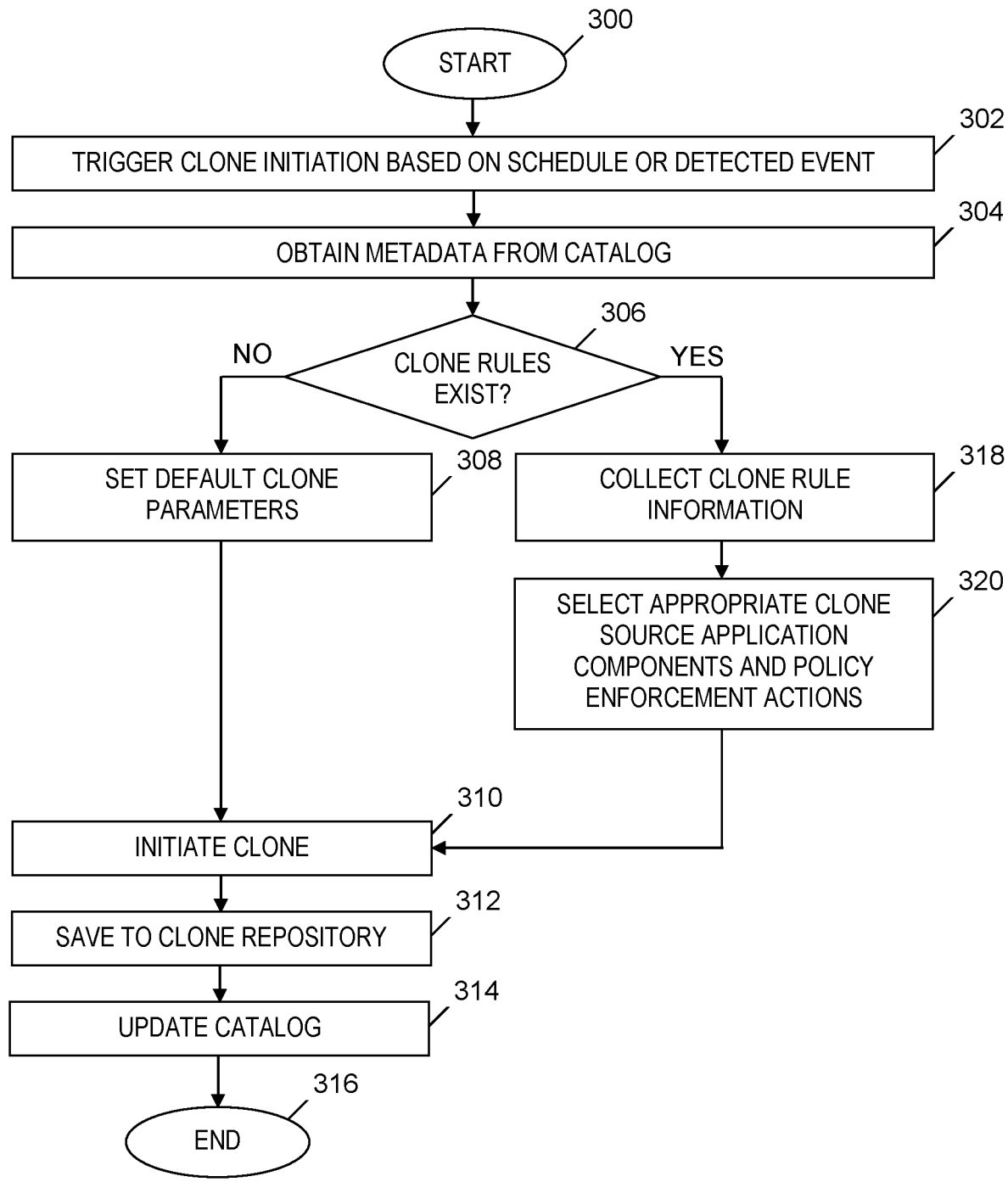
FIG. 3 is a flowchart of a process of cloning an application in a containerized platform, where the process is implemented in the system of FIG. 1, in accordance with embodiments of the present invention.

FIG. 3 is a flowchart of a process of cloning an application in a containerized platform, where the process is implemented in the system of FIG. 1, in accordance with embodiments of the present invention. The process of FIG. 3 begins at a start node 300. In step 302, autonomous and optimal clone and reinstate system 104 (see FIG. 1) triggers an initiation of cloning a cloud-native containerized application. Hereinafter in the discussion of FIG. 3, the cloud-native containerized application is also referred to simply as "the application." The triggering of the initiation of cloning in step 302 is in response to a scheduled cloning of the application (e.g., initiate cloning every Tuesday) or the autonomous and optimal clone and reinstate system 104 (see FIG. 1) detecting an occurrence of an event designated as a trigger for cloning the application (e.g., initiate cloning on a particular Monday because detected sales over the weekend exceeded a threshold level).

In step 304, autonomous and optimal clone and reinstate system 104 (see FIG. 1) obtains metadata about the application from governance catalog 112 (see FIG. 1). The metadata obtained in step 304 includes a definition of components (i.e., microservices) of the application. In one embodiment, step 304 is performed subsequent to one or more performances of the process of FIG. 2, which obtains metadata for one or more containerized applications to update governance catalog 112 (see FIG. 1).

In step 306, autonomous and optimal clone and reinstate system 104 (see FIG. 1) determines whether clone rules for the application exist in governance catalog 112 (see FIG. 1) by searching governance catalog 112 (see FIG. 1) for clone rules associated with the metadata obtained in step 304. If the search in step 306 does not find the clone rules, then autonomous and optimal clone and reinstate system 104 (see FIG. 1) determines that the clone rules do not exist in governance catalog 112 (see FIG. 1), the No branch of step 306 is followed, and step 308 is performed.

In step 308, autonomous and optimal clone and reinstate system 104 (see FIG. 1) selects or sets default clone parameters for cloning the application. The default clone parameters include, for example, specifications of the particular components of the application to be cloned and where to store the clone.

In step 310 and in response to performing step 308, autonomous and optimal clone and reinstate system 104 (see FIG. 1) initiates the cloning of the application (i.e., the cloning of the specified components of the application) by employing the default clone parameters.

In one embodiment, prior to step 310, autonomous and optimal clone and reinstate system 104 (see FIG. 1) quiesces the application and schedules cloning jobs in parallel on the cloud-native containerized platform. Subsequent to the quiescing of the application, step 310 includes autonomous and optimal clone and reinstate system 104 (see FIG. 1) exporting data from the specified or selected components of the application to clone repository 120 (see FIG. 1) by employing the cloning jobs executed in parallel.

In step 312, after the cloning is complete, autonomous and optimal clone and reinstate system 104 (see FIG. 1) saves the clone of the application to clone repository 120 (see FIG. 1), where the clone being saved includes data in the cloned components of the application.

In step 314, autonomous and optimal clone and reinstate system 104 (see FIG. 1) updates governance catalog 112 (see FIG. 1) by adding information about the cloning of the application, where the information includes specifications of the cloned components of the application. In one embodiment, the information in step 314 includes, but is not limited to, the date and time of the cloning, an identification of the entity who initiated the cloning, the amount of time taken to complete the cloning, the size of the clone, and where the clone is stored. Autonomous and optimal clone and reinstate system 104 (see FIG. 1) uses the information added in step 314 to ensure regulatory requirements are satisfied.

Following step 314, the process of FIG. 3 ends at an end node 316.

Returning to step 306, if the search finds the clone rules, then autonomous and optimal clone and reinstate system 104 (see FIG. 1) determines that the clone rules exist in governance catalog 112 (see FIG. 1), the Yes branch of step 306 is followed, and step 318 is performed.

In step 318, autonomous and optimal clone and reinstate system 104 (see FIG. 1) identifies and obtains clone rules and collects information about the clone rules, which are rules that apply to a cloning of the application.

In one embodiment, the clone rules include, but are not limited to, specifications of (i) one or more entities who are permitted to trigger the cloning of the application, (ii) the multiple application components as being permitted to be cloned, (iii) a method for quiescing the application, (iv) a method of encryption or obfuscation required for cloning of the multiple application components, (v) a storage medium permitted to be used in the cloning of the multiple application components, and (vi) one or more entities who require notification of the cloning of the multiple application components.

In step 320, autonomous and optimal clone and reinstate system 104 (see FIG. 1) selects appropriate clone source application components from a plurality of components of the application and selects policy enforcement actions by applying parameters for cloning the application in compliance with the clone rules. Selecting the clone source application components includes selecting components of the application in compliance with the information collected in step 318 about the clone rules that apply to the application (i.e., determining that the cloning of the selected components is in compliance with the clone rules). The policy enforcement actions are based on considerations in compliance with the clone rules, where the considerations include, but are not limited to, (i) who can trigger the cloning of the application, (ii) what components of the application can be cloned, (iii) how can the components of the application be quiesced, (iv) what encryption or obfuscation measures are needed for the cloning, and (v) what storage media are to be used for storing the clone.

In step 310 and following step 320, autonomous and optimal clone and reinstate system 104 (see FIG. 1) initiates the cloning of the application (i.e., the cloning of the selected components of the application) by employing the clone rules whose information was collected in step 318.

In step 312, after the cloning is complete following steps 320 and 310 in succession, autonomous and optimal clone and reinstate system 104 (see FIG. 1) saves the clone of the application to clone repository 120 (see FIG. 1), where the clone being saved includes data in the cloned components of the application. Again, in step 314 autonomous and optimal clone and reinstate system 104 (see FIG. 1) updates governance catalog 112 (see FIG. 1) by adding information about the cloning of the application, where the information includes specifications of the cloned components of the application. Again, following step 314, the process of FIG. 3 ends at the end node 316.

Figure 4:
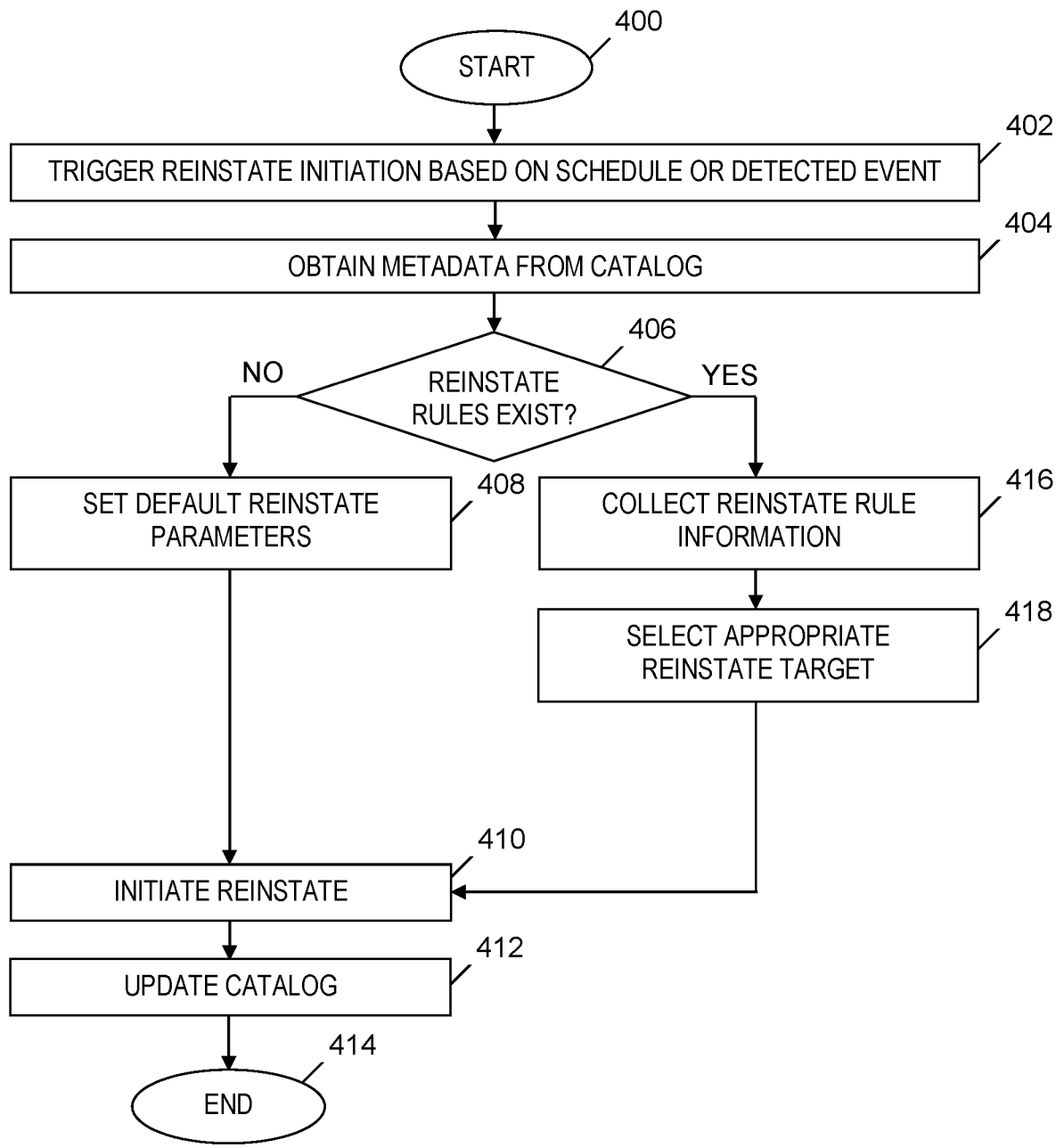
FIG. 4 is a flowchart of a process of reinstating a clone of an application in a containerized platform, where the process is implemented in the system of FIG. 1, in accordance with embodiments of the present invention.

FIG. 4 is a flowchart of a process of reinstating a clone of an application in a containerized platform, where the process is implemented in the system of FIG. 1, in accordance with embodiments of the present invention. The process of FIG. 4 begins at a start node 400. In step 402, autonomous and optimal clone and reinstate system 104 (see FIG. 1) triggers an initiation of reinstating a clone of a cloud-native containerized application. Hereinafter in the discussion of FIG. 4, the cloud-native containerized application is also referred to simply as "the application." The triggering of the initiation of reinstating in step 402 is in response to a scheduled reinstatement of the clone of the application (e.g., initiate reinstating the most recent clone every Monday) or the autonomous and optimal clone and reinstate system 104 (see FIG. 1) receiving instructions to initiate reinstating the clone of the application based on an occurrence of an event or activity.

In step 404, autonomous and optimal clone and reinstate system 104 (see FIG. 1) obtains metadata about the application from governance catalog 112 (see FIG. 1). In one embodiment, step 404 is performed subsequent to one or more performances of the process of FIG. 2, which obtains metadata for one or more containerized applications to update governance catalog 112 (see FIG. 1).

In step 406, autonomous and optimal clone and reinstate system 104 (see FIG. 1) determines whether reinstate rules for the application (i.e., rules specifying the reinstatement of the clone of the application) exist in governance catalog 112 (see FIG. 1) by searching governance catalog 112 (see FIG. 1) for reinstate rules associated with the metadata obtained in step 404. If the search in step 406 does not find the reinstate rules, then autonomous and optimal clone and reinstate system 104 (see FIG. 1) determines that the reinstate rules for the application do not exist in governance catalog 112 (see FIG. 1), the No branch of step 406 is followed, and step 408 is performed.

In step 408 and in response to determining that the reinstate rules do not exist in step 406, autonomous and optimal clone and reinstate system 104 (see FIG. 1) selects or sets default reinstate parameters for reinstating a clone of the application. The default clone parameters include, for example, specifications of who is permitted to initiate the reinstatement of the clone of the application and where to store the reinstated clone.

In step 410, autonomous and optimal clone and reinstate system 104 (see FIG. 1) initiates the reinstatement of the clone of the application by employing the default reinstate parameters that were set in step 408.

In one embodiment, prior to step 410, autonomous and optimal clone and reinstate system 104 (see FIG. 1) schedules reinstating jobs in parallel on the cloud-native containerized platform. Subsequent to the scheduling of the reinstating jobs, step 410 includes autonomous and optimal clone and reinstate system 104 (see FIG. 1) importing data from clone repository 120 (see FIG. 1) for the reinstatement of the clone of the application by employing the reinstating jobs executed in parallel.

In step 412, after the reinstatement of the clone of the application is complete, autonomous and optimal clone and reinstate system 104 (see FIG. 1) updates governance catalog 112 (see FIG. 1) by adding information about the reinstatement of the clone of the application, where the information includes specifications of the reinstated clone of the application. In one embodiment, the information in step 412 includes, but is not limited to, the date and time of the reinstating, an identification of the entity who initiated the reinstating, the amount of time taken to complete the reinstating, the size of the reinstated clone, and where the reinstated clone is stored. Autonomous and optimal clone and reinstate system 104 (see FIG. 1) uses the information added in step 412 to ensure regulatory requirements are satisfied.

Following step 412, the process of FIG. 4 ends at an end node 414.

Returning to step 406, if the search finds the reinstate rules, then autonomous and optimal clone and reinstate system 104 (see FIG. 1) determines that the reinstate rules exist in governance catalog 112 (see FIG. 1), the Yes branch of step 406 is followed, and step 416 is performed.

In step 416, autonomous and optimal clone and reinstate system 104 (see FIG. 1) identifies and obtains reinstate rules and collects information about the reinstate rules, which are rules that apply to reinstating a clone of the application.

In one embodiment, the reinstate rules include, but are not limited to, specifications of (i) one or more entities who are permitted to trigger the reinstatement of the clone of the application, (ii) a storage medium permitted to be used in the reinstatement of the clone of the application, and (iii) one or more entities who require a notification of the reinstatement of the clone of the application.

In step 418, autonomous and optimal clone and reinstate system 104 (see FIG. 1) selects an appropriate reinstate target by applying parameters for reinstating the clone of the application in compliance with the reinstate rules. Step 418 includes autonomous and optimal clone and reinstate system 104 (see FIG. 1) selecting policy enforcement actions based on considerations in compliance with the reinstate rules, where the considerations include, but are not limited to, (i) who can trigger the reinstating of the clone of the application, (ii) what entity or entities need to be notified about the reinstatement, and (iii) what storage media options can be used for storing the reinstated clone.

In step 410 and following step 418, autonomous and optimal clone and reinstate system 104 (see FIG. 1) initiates the reinstating of the clone of the application by employing the reinstate rules whose information was collected in step 416.

In step 412, after the cloning is complete following steps 418 and 410 in succession, autonomous and optimal clone and reinstate system 104 (see FIG. 1) updates governance catalog 112 (see FIG. 1) by adding information (as described above) about the reinstatement of the clone of the application. Again, following step 412, the process of FIG. 4 ends at the end node 414.

Machine Learning-Based Classifier

Figure 5:
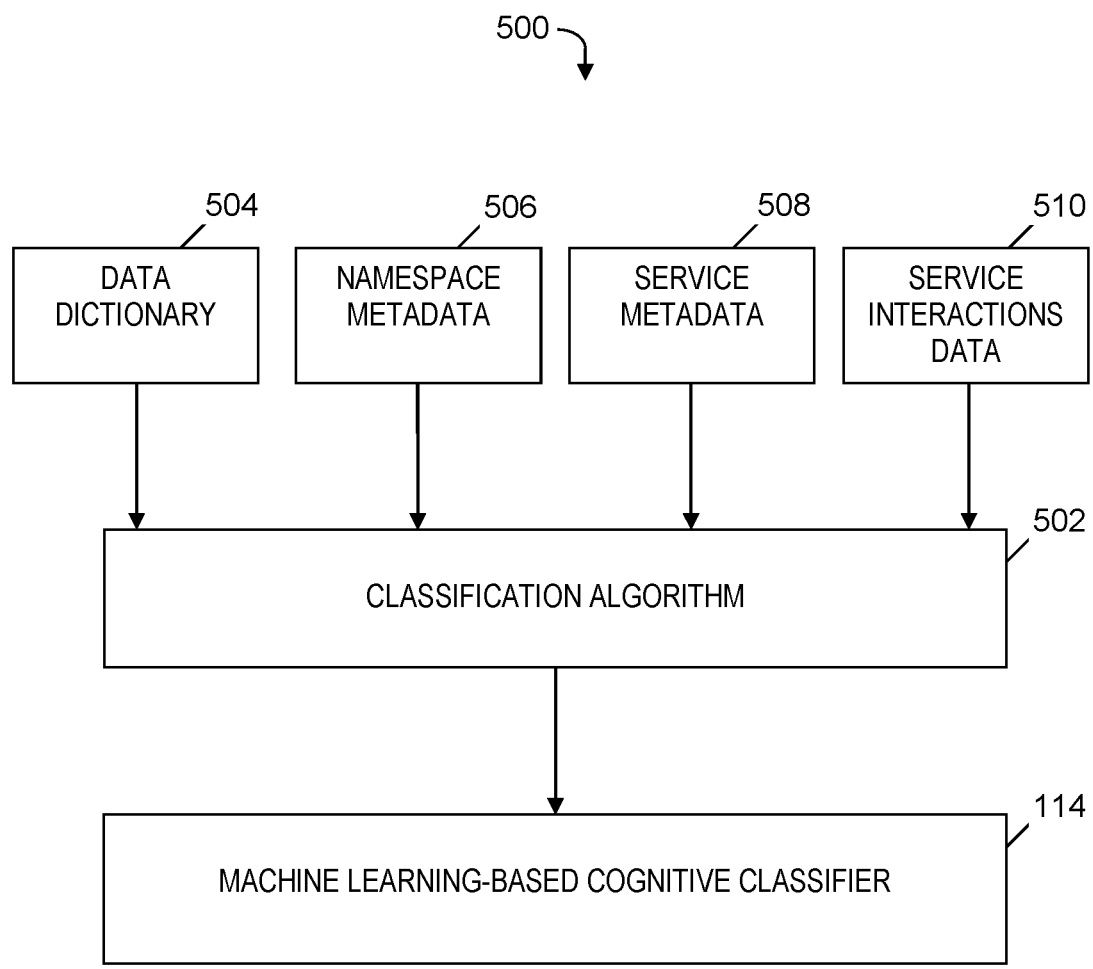
FIG. 5 is a block diagram of a machine learning-based cognitive classifier and components used to train the machine learning-based cognitive classifier, where the classifier is included in the system of FIG. 1, in accordance with embodiments of the present invention.

FIG. 5 is a block diagram of machine learning-based cognitive classifier 114 and components used to train the machine learning-based cognitive classifier 114, where the classifier is included in the system of FIG. 1, in accordance with embodiments of the present invention. In a training phase, a classification algorithm 502 receives the following input from a plurality of applications in the cloud-native containerized platform: data dictionary 504, namespace metadata 506 (i.e., metadata of namespaces associated with microservices included in the plurality of applications), service metadata 508 (i.e., metadata of the microservices included in the plurality of applications), and service interactions data 510 (i.e., data about interactions among the microservices). Classification algorithm 502 uses the aforementioned input to train machine learning-based cognitive classifier 114 and generate a classification model. Autonomous and optimal clone and reinstate system 104 (see FIG. 1) employs the classification model to determine inter-relationships between enterprise assets, such as inter-relationships among the application, other application(s), and clone(s) of the application.

For example, autonomous and optimal clone and reinstate system 104 (see FIG. 1) can use the classification model generated by machine learning-based cognitive classifier 114 to determine that a human resources application XYZ-ABC being cloned is related to a sales application GHI. Over time, the classification model learns more relationships among enterprise assets. For a subsequent cloning of a different application XYZDEF, machine learning-based cognitive classifier 114 determines that attributes of application XYZDEF match attributes of application XYZABC (e.g., both applications have names that start with the same combination of letters "XYZ"), and therefore determines that application XYZDEF is a human resources application (i.e., the same type of application as application XYZABC) and is related to a sales application (i.e., related to an application of the same type as application GHI, which is a sales application related to human resources application XYZABC).

EXAMPLES

Figure 6:
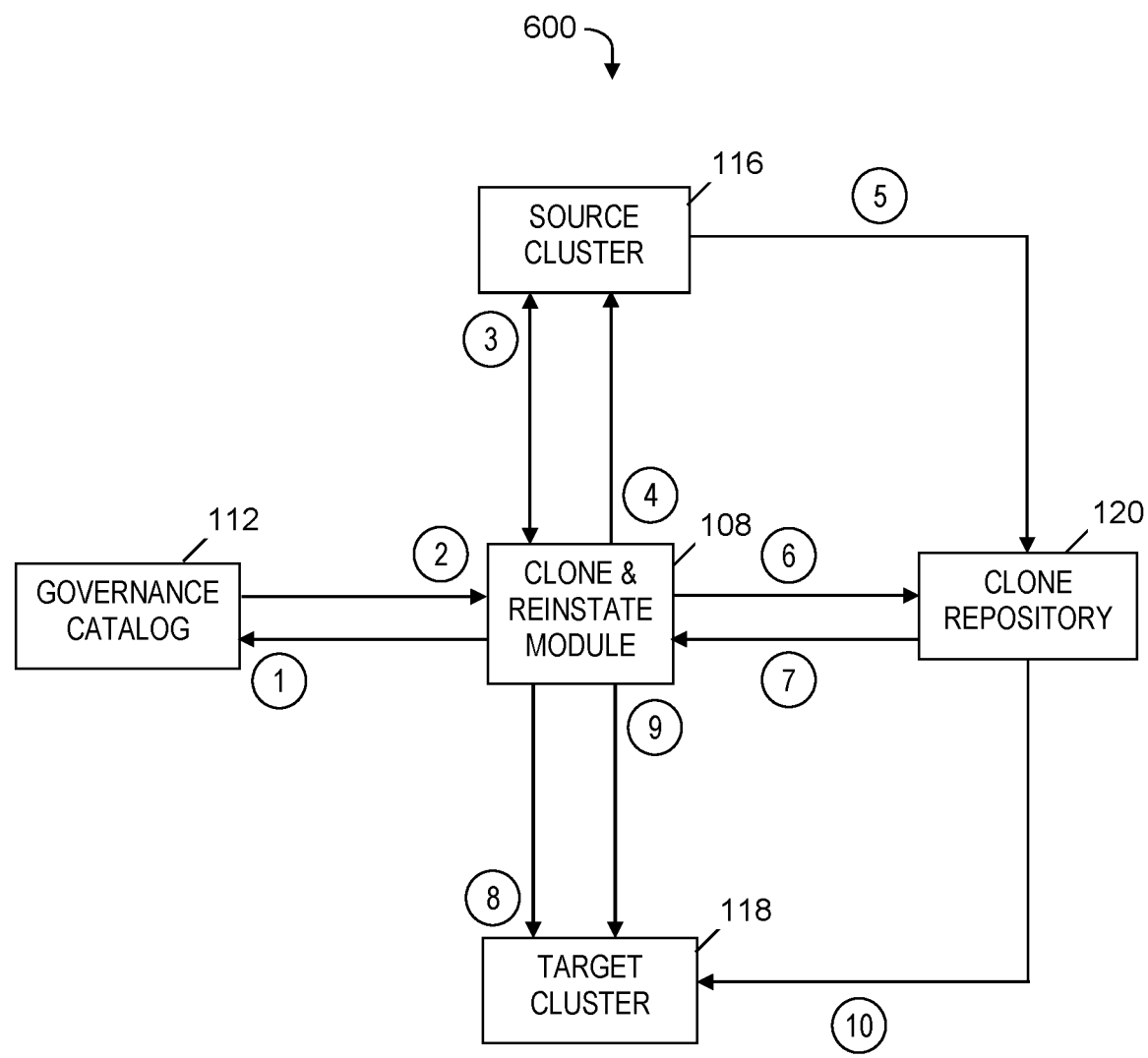
FIG. 6 is an example of cloning and reinstating an application in a containerized platform using the processes of FIG. 3 and FIG. 4 and the system of FIG. 1, in accordance with embodiments of the present invention.

FIG. 6 is an example 600 of cloning, archiving, and reinstating an application in a containerized platform using the processes of FIG. 3 and FIG. 4 and the system of FIG. 1, in accordance with embodiments of the present invention. Steps in example 600 are illustrated by circled numbers 1 through 10. Steps 1-2 describe prefatory steps for cloning and reinstating of the cloud-native containerized application. Steps 3-6 describe a cloning of the cloud-native containerized application. Steps 7-10 describe a reinstating of a clone of the cloud-native containerized application.

In step 1, clone & reinstate module 108 inserts and/or updates clone metadata and activity information in governance catalog 112 for a cloning of a cloud-native containerized application. In step 2, clone & reinstate module 108 checks rules in governance catalog 112 to enforce governance for the cloning of the cloud-native containerized application.

In step 3, clone & reinstate module 108 downloads (i) metadata that defines component of the cloud-native containerized application and (ii) the current state of the cloud-native containerized application. The current state includes then number of replicas of the cloud-native containerized application that are running. The current state allows the running of multiple replicas of the cloud-native containerized application to provide high availability of the application.

In step 4, clone & reinstate module 108 spawns parallel data export jobs in source cluster 116. Source cluster 116 analyzes the cloning of each of the components of the cloud-native containerized application. In step 5, source cluster 116 copies information resulting from the analysis of the cloning of each of the components to clone repository 120. Clone repository 120 may be a high-performance clustered file system (e.g., General Parallel File System), a distributed file system (e.g., network file system (NFS)), or another storage system.

In step 6, clone & reinstate module 108 publishes the metadata and the state for the clone in clone repository 120.

Steps 1 and 2 are again performed prior to step 7. In step 1 in preparation for step 7, clone & reinstate module 108 inserts and/or updates metadata and activity information in governance catalog 112 for a reinstatement of a clone of the cloud-native containerized application. In step 2 immediately preceding step 7, clone & reinstate module 108 checks rules in governance catalog 112 to enforce governance for the reinstatement of the clone of the cloud-native containerized application.

In step 7, clone & reinstate module 108 downloads metadata and the state of the cloud-native containerized application from clone repository 120.

In step 8, clone & reinstate module 108 applies the downloaded metadata to target cluster 118 and restores the state of the cloud-native containerized application to target cluster 118.

In step 9, clone & reinstate module 108 spawns parallel data import jobs in target cluster 118.

In step 10, in response to performing the parallel data import jobs, target cluster 118 downloads data for the reinstatement from clone repository 120.

After the cloning and reinstating, clone & reinstate module 108 updates governance catalog 112 with information about the cloning and reinstating, as described above in the discussions of FIG. 3 and FIG. 4.

In one embodiment, steps 1-10 are used to generate and reinstate clones of different applications in multiple source clusters. Clone & reinstate module 108 stores the clones of the different applications in clone repository 120. Clone & reinstate module 108 can reinstate the clones of the different applications from clone repository 120.

Computer System

Figure 7:
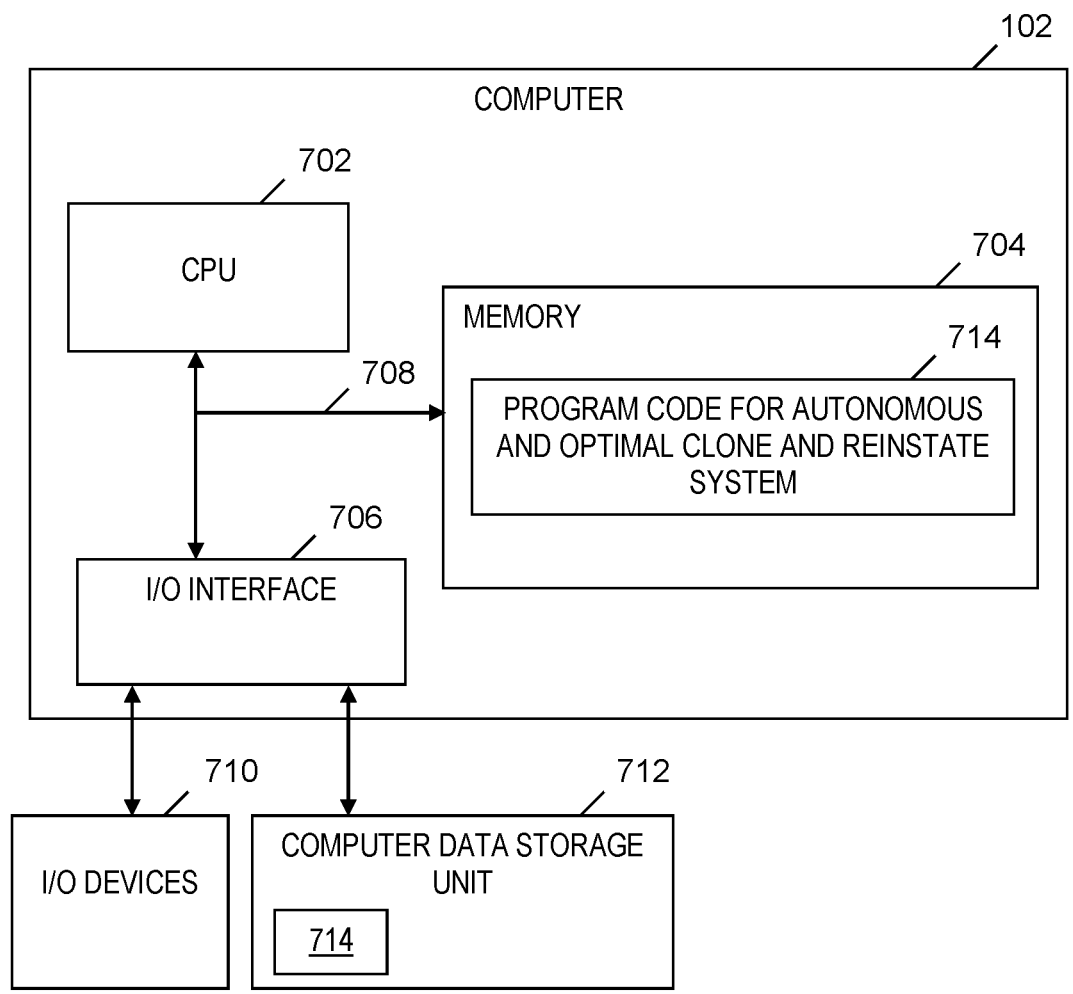
FIG. 7 is a block diagram of a computer that is included in the system of FIG. 1 and that implements the processes of FIG. 2, FIG. 3, and FIG. 4, in accordance with embodiments of the present invention.

FIG. 7 is a block diagram of a computer that is included in the system of FIG. 1 and that implements the processes of FIG. 2, FIG. 3, and FIG. 4, in accordance with embodiments of the present invention. Computer 102 is a computer system that generally includes a central processing unit (CPU) 702, a memory 704, an input/output (I/O) interface 706, and a bus 708. Further, computer 102 is coupled to I/O devices 710 and a computer data storage unit 712. CPU 702 performs computation and control functions of computer 102, including executing instructions included in program code 714 for autonomous and optimal clone and reinstate system 104 (see FIG. 1) to perform a method of autonomous and optimal cloning, reinstating, and archiving of a containerized application, where the instructions are executed by CPU 702 via memory 704. CPU 702 may include a single processing unit or processor or be distributed across one or more processing units or one or more processors in one or more locations (e.g., on a client and server).

Memory 704 includes a known computer readable storage medium, which is described below. In one embodiment, cache memory elements of memory 704 provide temporary storage of at least some program code (e.g., program code 714) in order to reduce the number of times code must be retrieved from bulk storage while instructions of the program code are executed. Moreover, similar to CPU 702, memory 704 may reside at a single physical location, including one or more types of data storage, or be distributed across a plurality of physical systems or a plurality of computer readable storage media in various forms. Further, memory 704 can include data distributed across, for example, a local area network (LAN) or a wide area network (WAN).

I/O interface 706 includes any system for exchanging information to or from an external source. I/O devices 710 include any known type of external device, including a display, keyboard, etc. Bus 708 provides a communication link between each of the components in computer 102, and may include any type of transmission link, including electrical, optical, wireless, etc.

I/O interface 706 also allows computer 102 to store information (e.g., data or program instructions such as program code 714) on and retrieve the information from computer data storage unit 712 or another computer data storage unit (not shown). Computer data storage unit 712 includes one or more known computer readable storage media, where a computer readable storage medium is described below. In one embodiment, computer data storage unit 712 is a non-volatile data storage device, such as, for example, a solid-state drive (SSD), a network-attached storage (NAS) array, a storage area network (SAN) array, a magnetic disk drive (i.e., hard disk drive), or an optical disc drive (e.g., a CD-ROM drive which receives a CD-ROM disk or a DVD drive which receives a DVD disc).

Memory 704 and/or storage unit 712 may store computer program code 714 that includes instructions that are executed by CPU 702 via memory 704 to autonomously and optimally clone, reinstate, and archive a containerized application. Although FIG. 7 depicts memory 704 as including program code, the present invention contemplates embodiments in which memory 704 does not include all of code 714 simultaneously, but instead at one time includes only a portion of code 714.

Further, memory 704 may include an operating system (not shown) and may include other systems not shown in FIG. 7. Clone repository 120 (see FIG. 1) may be included in computer data storage unit 712.

As will be appreciated by one skilled in the art, in a first embodiment, the present invention may be a method; in a second embodiment, the present invention may be a system; and in a third embodiment, the present invention may be a computer program product. The computer program product may include one or more computer readable storage media (i.e., memory 704 and computer data storage unit 712) having computer readable program code 714 collectively stored on the one or more computer readable storage media, where the program code is executed by CPU 702 to cause computer 102 to perform aspects of the present invention.

Any of the components of an embodiment of the present invention can be deployed, managed, serviced, etc. by a service provider that offers to deploy or integrate computing infrastructure with respect to autonomous and optimal cloning, reinstating, and archiving of a containerized application. Thus, an embodiment of the present invention discloses a process for supporting computer infrastructure, where the process includes providing at least one support service for at least one of integrating, hosting, maintaining and deploying computer-readable code (e.g., program code 714) in a computer system (e.g., computer 102) including one or more processors (e.g., CPU 702), wherein the processor(s) carry out instructions contained in the code causing the computer system to autonomously and optimally clone, reinstate, and archive a containerized application. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of autonomous and optimal cloning, reinstating, and archiving of a containerized application.

While it is understood that program code 714 for autonomous and optimal cloning, reinstating, and archiving of a containerized application may be deployed by manually loading directly in client, server and proxy computers (not shown) via loading a computer-readable storage medium (e.g., computer data storage unit 712), program code 714 may also be automatically or semi-automatically deployed into computer 102 by sending program code 714 to a central server or a group of central servers. Program code 714 is then downloaded into client computers (e.g., computer 102) that will execute program code 714. Alternatively, program code 714 is sent directly to the client computer via e-mail. Program code 714 is then either detached to a directory on the client computer or loaded into a directory on the client computer by a button on the e-mail that executes a program that detaches program code 714 into a directory. Another alternative is to send program code 714 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 714 is transmitted to the proxy server and then it is stored on the proxy server.

Another embodiment of the invention provides a method that performs the process steps on a subscription, advertising and/or fee basis. That is, a service provider can offer to create, maintain, support, etc. a process of autonomous and optimal cloning, reinstating, and archiving of a containerized application. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 704 and computer data storage unit 712) having computer readable program instructions 714 thereon for causing a processor (e.g., CPU 702) to carry out aspects of the present invention.

The computer readable storage medium can be a tangible device that can retain and store instructions (e.g., program code 714) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 714) described herein can be downloaded to respective computing/processing devices (e.g., computer 102) from a computer readable storage medium or to an external computer or external storage device (e.g., computer data storage unit 712) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 714) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2, FIG. 3, and FIG. 4) and/or block diagrams (e.g., FIG. 1 and FIG. 7) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 714).

These computer readable program instructions may be provided to a processor (e.g., CPU 702) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 712) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 714) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
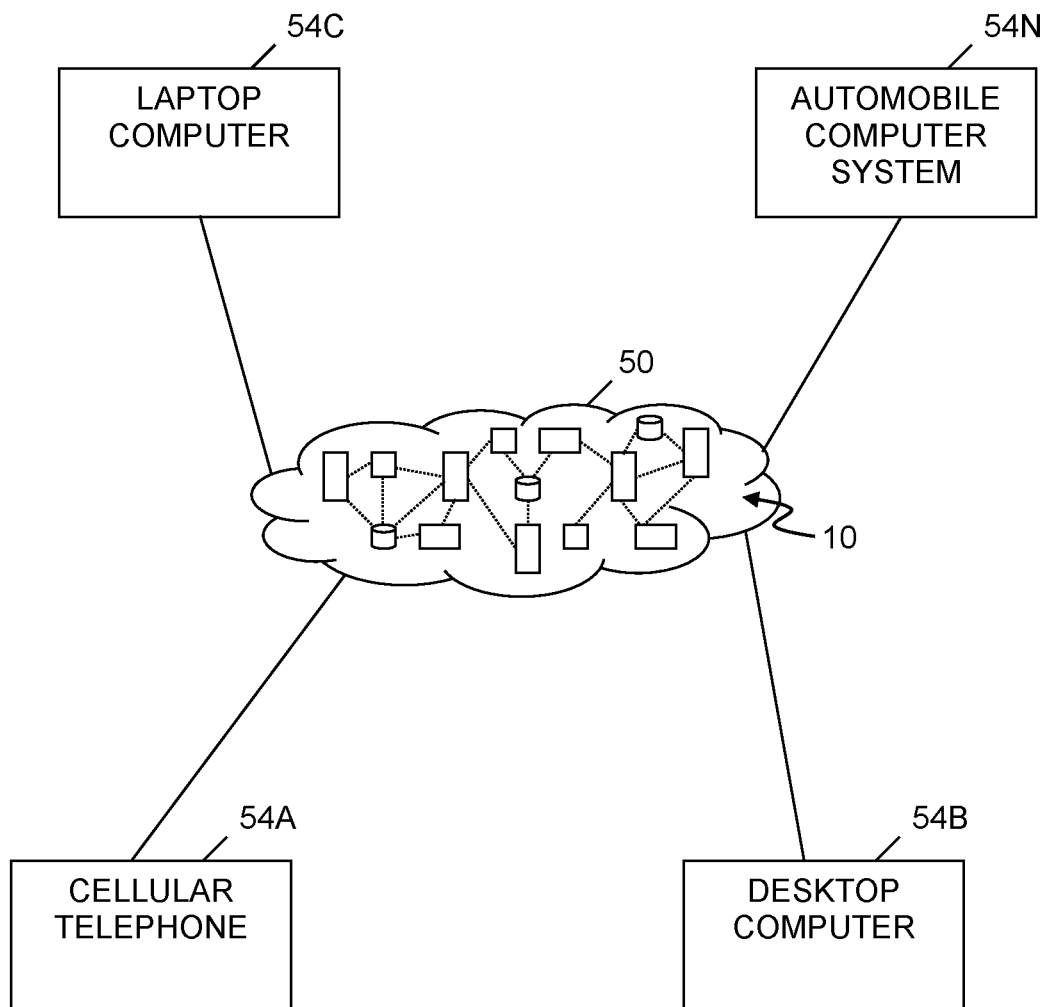
FIG. 8 depicts a cloud computing environment, in accordance with embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 8 are intended to be illustrative only and that computing nodes 10 and cloud computing environment 50 can communicate with any type of computerized device over any type of network and/or network addressable connection (e.g., using a web browser).

Figure 9:
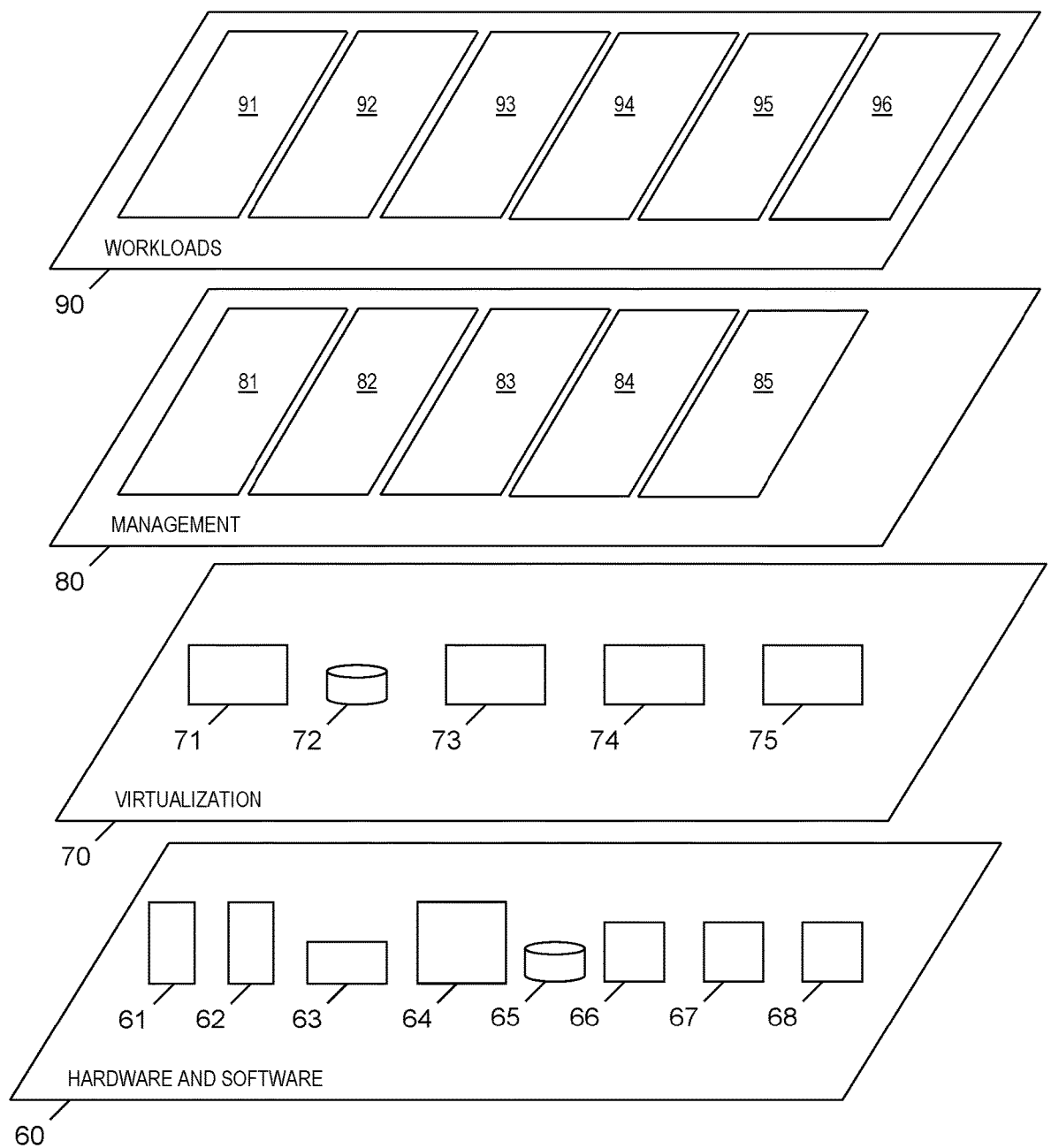
FIG. 9 depicts abstraction model layers, in accordance with embodiments of the present invention.

Referring now to FIG. 9, a set of functional abstraction layers provided by cloud computing environment 50 (see FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and autonomous and optimized cloning, reinstating, and archiving of an application in a containerized platform 96.

What is claimed is:

1. A computer system comprising:
    a central processing unit (CPU);
    a memory coupled to the CPU; and
    one or more computer readable storage media coupled to the CPU, the one or more computer readable storage media collectively containing instructions that are executed by the CPU via the memory to implement a method of cloning, reinstating, and archiving an application, the method comprising:
        the computer system identifying a triggering of a cloning of an application in a cloud-native containerized platform;
        in response to the identifying the triggering of the cloning of the application, the computer system obtaining application metadata from a catalog, the application metadata defining components of the application;
        based on the application metadata, the computer system identifying and obtaining rules specifying the cloning of the application;
        based on the rules, the computer system selecting multiple application components included in a plurality of components of the application and the computer system determining that a cloning of the multiple application components is compliant with the rules;
        in response to the selecting the multiple application components and the determining that the cloning of the multiple application components is compliant with the rules, the computer system cloning the multiple application components;
        the computer system saving data in the cloned multiple application components to a clone repository; and
        the computer system updating the catalog with specifications of the cloned multiple application components, wherein the rules include specifications of (i) one or more entities who are permitted to trigger the cloning of the application, (ii) the multiple application components as being permitted to be cloned, (iii) a method for quiescing the application, (iv) a method of encryption or obfuscation required for the cloning of the multiple application components, (v) a storage medium permitted to be used in the cloning of the multiple application components, and (vi) one or more entities who require notification of the cloning of the multiple application components.

2. The computer system of claim 1, wherein the method further comprises:
    the computer system quiescing the application; and
    the computer system scheduling cloning jobs in parallel on the cloud-native containerized platform,
    wherein the cloning the multiple application components includes exporting data from the multiple application components to the clone repository by employing the cloning jobs in parallel subsequent to the quiescing the application.

3. The computer system of claim 1, wherein the method further comprises:
    the computer system identifying a triggering of a cloning of a second application in the cloud-native containerized platform;
    in response to the identifying the triggering of the cloning of the second application, the computer system obtaining second application metadata from the catalog, the second application metadata defining components of the second application;
    based on the second application metadata, the computer system determining that rules specifying the cloning of the second application do not exist in the catalog;
    in response to the determining that the rules specifying the cloning of the second application do not exist in the catalog, the computer system selecting default cloning parameters;
    based on the default cloning parameters, the computer system selecting second multiple application components included in the plurality of components of the application;
    in response to the selecting the second multiple application components, the computer system cloning the second multiple application components;
    the computer system saving data in the cloned second multiple application components to the clone repository; and
    the computer system updating the catalog with specifications of the cloned second multiple application components.

4. The computer system of claim 1, wherein the method further comprises:
    the computer system identifying a triggering of a reinstatement of a clone of the application;
    in response to the identifying the triggering of the reinstatement, the computer system obtaining the application metadata from the catalog;

based on the application metadata, the computer system identifying and obtaining reinstate rules specifying the reinstatement of the clone of the application;

the computer system determining that the reinstatement of the clone of the application is compliant with the reinstate rules;

in response to the determining that the reinstatement of the clone of the application is compliant with the reinstate rules, the computer system reinstating the clone of the application; and the computer system updating the catalog with specifications of the reinstated clone of the application.

5. The computer system of claim 4, wherein the method further comprises:

the computer system scheduling reinstating jobs in parallel on the cloud-native containerized platform, wherein the reinstating the clone of the application includes importing data from the clone repository for the reinstatement of the clone of the application by employing the reinstating jobs in parallel.

6. The computer system of claim 4, wherein the reinstate rules include specifications of (i) one or more entities who are permitted to trigger the reinstatement of the clone of the application, (ii) a storage medium permitted to be used in the reinstatement of the clone of the application, and (iii) one or more entities who require a notification of the reinstatement of the clone of the application.

7. The computer system of claim 4, wherein the method further comprises:

the computer system identifying a triggering of a reinstatement of a clone of a second application in the cloud-native containerized platform;

in response to the identifying the triggering of the reinstatement of the clone of the second application, the computer system obtaining second application metadata from the catalog;

based on the second application metadata, the computer system determining that rules specifying the reinstatement of the clone of the second application do not exist in the catalog;

in response to the determining that the rules specifying the reinstatement of the clone of the second application do not exist in the catalog, the computer system selecting default reinstate parameters;

based on the default reinstate parameters, the computer system reinstating the clone of the second application; and the computer system updating the catalog with specifications of the reinstated clone of the second application.

8. A computer program product for cloning, reinstating, and archiving an application, the computer program product comprising:

one or more computer readable storage media having computer readable program code collectively stored on the one or more computer readable storage media, the computer readable program code being executed by a central processing unit (CPU) of a computer system to cause the computer system to perform a method comprising:

the computer system identifying a triggering of a cloning of an application in a cloud-native containerized platform;

in response to the identifying the triggering of the cloning of the application, the computer system obtaining application metadata from a catalog, the application metadata defining components of the application;

based on the application metadata, the computer system identifying and obtaining rules specifying the cloning of the application;

based on the rules, the computer system selecting multiple application components included in a plurality of components of the application and the computer system determining that a cloning of the multiple application components is compliant with the rules;

in response to the selecting the multiple application components and the determining that the cloning of the multiple application components is compliant with the rules, the computer system cloning the multiple application components;

the computer system saving data in the cloned multiple application components to a clone repository; and the computer system updating the catalog with specifications of the cloned multiple application components, wherein the rules include specifications of (i) one or more entities who are permitted to trigger the cloning of the application, (ii) the multiple application components as being permitted to be cloned, (iii) a method for quiescing the application, (iv) a method of encryption or obfuscation required for the cloning of the multiple application components, (v) a storage medium permitted to be used in the cloning of the multiple application components, and (vi) one or more entities who require notification of the cloning of the multiple application components.

9. The computer program product of claim 8, wherein the method further comprises:

the computer system quiescing the application; and the computer system scheduling cloning jobs in parallel on the cloud-native containerized platform, wherein the cloning the multiple application components includes exporting data from the multiple application components to the clone repository by employing the cloning jobs in parallel subsequent to the quiescing the application.

10. The computer program product of claim 8, wherein the method further comprises:

the computer system identifying a triggering of a cloning of a second application in the cloud-native containerized platform;

in response to the identifying the triggering of the cloning of the second application, the computer system obtaining second application metadata from the catalog, the second application metadata defining components of the second application;

based on the second application metadata, the computer system determining that rules specifying the cloning of the second application do not exist in the catalog;

in response to the determining that the rules specifying the cloning of the second application do not exist in the catalog, the computer system selecting default cloning parameters;

based on the default cloning parameters, the computer system selecting second multiple application components included in the plurality of components of the application;

in response to the selecting the second multiple application components, the computer system cloning the second multiple application components;

the computer system saving data in the cloned second multiple application components to the clone repository; and the computer system updating the catalog with specifications of the cloned second multiple application components.

11. The computer program product of claim 8, wherein the method further comprises:
the computer system identifying a triggering of a reinstatement of a clone of the application;
in response to the identifying the triggering of the reinstatement, the computer system obtaining the application metadata from the catalog;
based on the application metadata, the computer system identifying and obtaining reinstate rules specifying the reinstatement of the clone of the application;
the computer system determining that the reinstatement of the clone of the application is compliant with the reinstate rules;
in response to the determining that the reinstatement of the clone of the application is compliant with the reinstate rules, the computer system reinstating the clone of the application; and
the computer system updating the catalog with specifications of the reinstated clone of the application.

12. The computer program product of claim 11, wherein the method further comprises:
the computer system scheduling reinstating jobs in parallel on the cloud-native containerized platform,
wherein the reinstating the clone of the application includes importing data from the clone repository for the reinstatement of the clone of the application by employing the reinstating jobs in parallel.

13. The computer program product of claim 11, wherein the reinstate rules include specifications of (i) one or more entities who are permitted to trigger the reinstatement of the clone of the application, (ii) a storage medium permitted to be used in the reinstatement of the clone of the application, and (iii) one or more entities who require a notification of the reinstatement of the clone of the application.

14. The computer program product of claim 11, wherein the method further comprises:
the computer system identifying a triggering of a reinstatement of a clone of a second application in the cloud-native containerized platform;
in response to the identifying the triggering of the reinstatement of the clone of the second application, the computer system obtaining second application metadata from the catalog;
based on the second application metadata, the computer system determining that rules specifying the reinstatement of the clone of the second application do not exist in the catalog;
in response to the determining that the rules specifying the reinstatement of the clone of the second application do not exist in the catalog, the computer system selecting default reinstate parameters;
based on the default reinstate parameters, the computer system reinstating the clone of the second application; and
the computer system updating the catalog with specifications of the reinstated clone of the second application.

15. A computer-implemented method comprising:
identifying, by one or more processors, a triggering of a cloning of an application in a cloud-native containerized platform;
in response to the identifying the triggering of the cloning of the application, obtaining, by the one or more processors and from a catalog, application metadata defining components of the application;
based on the application metadata, identifying and obtaining, by the one or more processors, rules specifying the cloning of the application;
based on the rules, selecting, by the one or more processors, multiple application components included in a plurality of components of the application and determining, by the one or more processors, that a cloning of the multiple application components is compliant with the rules;
in response to the selecting the multiple application components and the determining that the cloning of the multiple application components is compliant with the rules, cloning, by the one or more processors, the multiple application components;
saving, by the one or more processors, data in the cloned multiple application components to a clone repository; and
updating, by the one or more processors, the catalog with specifications of the cloned multiple application components, wherein the rules include specifications of (i) one or more entities who are permitted to trigger the cloning of the application, (ii) the multiple application components as being permitted to be cloned, (iii) a method for quiescing the application, (iv) a method of encryption or obfuscation required for the cloning of the multiple application components, (v) a storage medium permitted to be used in the cloning of the multiple application components, and (vi) one or more entities who require notification of the cloning of the multiple application components.

16. The method of claim 15, further comprising:
quiescing, by the one or more processors, the application; and
scheduling, by the one or more processors, cloning jobs in parallel on the cloud-native containerized platform,
wherein the cloning the multiple application components includes exporting data from the multiple application components to the clone repository by employing the cloning jobs in parallel subsequent to the quiescing the application.

17. The method of claim 15, further comprising:
identifying, by one or more processors, a triggering of a cloning of a second application in the cloud-native containerized platform;
in response to the identifying the triggering of the cloning of the second application, obtaining, by the one or more processors and from the catalog, second application metadata defining components of the second application;
based on the second application metadata, determining, by the one or more processors, that rules specifying the cloning of the second application do not exist in the catalog;
in response to the determining that the rules specifying the cloning of the second application do not exist in the catalog, selecting, by the one or more processors, default cloning parameters;
based on the default cloning parameters, selecting, by the one or more processors, second multiple application components included in the plurality of components of the application;
in response to the selecting the second multiple application components, cloning, by the one or more processors, the second multiple application components;

saving, by the one or more processors, data in the cloned second multiple application components to the clone repository; and updating, by the one or more processors, the catalog with specifications of the cloned second multiple application components.

18. The method of claim 15, further comprising:

identifying, by the one or more processors, a triggering of a reinstatement of a clone of the application;

in response to the identifying the triggering of the reinstatement, obtaining, by the one or more processors and from the catalog, the application metadata;

based on the application metadata, identifying and obtaining, by the one or more processors, reinstate rules specifying the reinstatement of the clone of the application;

determining, by the one or more processors, that the reinstatement of the clone of the application is compliant with the reinstate rules;

in response to the determining that the reinstatement of the clone of the application is compliant with the reinstate rules, reinstating, by the one or more processors, the clone of the application; and updating, by the one or more processors, the catalog with specifications of the reinstated clone of the application.

19. The method of claim 18, further comprising:

scheduling, by the one or more processors, reinstating jobs in parallel on the cloud-native containerized platform, wherein the reinstating the clone of the application includes importing data from the clone repository for the reinstatement of the clone of the application by employing the reinstating jobs in parallel.

20. The method of claim 18, wherein the reinstate rules include specifications of (i) one or more entities who are permitted to trigger the reinstatement of the clone of the application, (ii) a storage medium permitted to be used in the reinstatement of the clone of the application, and (iii) one or more entities who require a notification of the reinstatement of the clone of the application.

21. A computer system comprising:

a central processing unit (CPU);

a memory coupled to the CPU; and one or more computer readable storage media coupled to the CPU, the one or more computer readable storage media collectively containing instructions that are executed by the CPU via the memory to implement a method of cloning, reinstating, and archiving an application, the method comprising:

the computer system collecting information from a plurality of applications in a cloud-native containerized platform, the plurality of applications including microservices, and the information being collected from a data dictionary, metadata of the microservices, metadata of namespaces associated with the microservices, and data about interactions among the microservices;

based on the collected information, the computer system training a machine learning-based cognitive classifier by employing a classification algorithm;

subsequent to the training the machine learning-based cognitive classifier, the computer system extracting application metadata defining components of an application and dependencies among the components in the cloud-native containerized platform;

the computer system determining that the extracted application metadata does not exist in a governance catalog;

in response to the determining that the extracted application metadata does not exist in the governance catalog, the computer system inferring one or more associations between the application and one or more other applications included in the plurality of applications by employing the trained machine learning-based cognitive classifier on the extracted application metadata;

the computer system receiving from a human subject matter expert a validation of an association between the application and another application included in the plurality of applications, the association being included in the inferred one or more associations;

based on the validation of the association, the computer system updating the governance catalog with the extracted application metadata;

subsequent to the updating the governance catalog, the computer system extracting second application metadata defining components of a second application and dependencies among the components of the second application in the cloud-native containerized platform;

the computer system determining that the extracted second application metadata exists in the governance catalog;

in response to the determining that the second extracted application metadata exists in the governance catalog, the computer system identifying policies and rules associated with the second application by employing the trained machine learning-based cognitive classifier;

the computer system updating the governance catalog with the identified policies and rules as being associated with the second application; and based on the updated governance catalog, the computer system cloning the components of the second application or reinstating a clone of the second application.

22. A computer program product for cloning, reinstating, and archiving an application, the computer program product comprising:

one or more computer readable storage media having computer readable program code collectively stored on the one or more computer readable storage media, the computer readable program code being executed by a central processing unit (CPU) of a computer system to cause the computer system to perform a method comprising:

the computer system collecting information from a plurality of applications in a cloud-native containerized platform, the plurality of applications including microservices, and the information being collected from a data dictionary, metadata of the microservices, metadata of namespaces associated with the microservices, and data about interactions among the microservices;

based on the collected information, the computer system training a machine learning-based cognitive classifier by employing a classification algorithm;

subsequent to the training the machine learning-based cognitive classifier, the computer system extracting application metadata defining components of an application and dependencies among the components in the cloud-native containerized platform;

the computer system determining that the extracted application metadata does not exist in a governance catalog;

in response to the determining that the extracted application metadata does not exist in the governance catalog, the computer system inferring one or more associations between the application and one or more other applications included in the plurality of applications by employing the trained machine learning-based cognitive classifier on the extracted application metadata;

the computer system receiving from a human subject matter expert a validation of an association between the application and another application included in the plurality of applications, the association being included in the inferred one or more associations;

based on the validation of the association, the computer system updating the governance catalog with the extracted application metadata;

subsequent to the updating the governance catalog, the computer system extracting second application metadata defining components of a second application and dependencies among the components of the second application in the cloud-native containerized platform;

the computer system determining that the extracted second application metadata exists in the governance catalog;

in response to the determining that the second extracted application metadata exists in the governance catalog, the computer system identifying policies and rules associated with the second application by employing the trained machine learning-based cognitive classifier;

the computer system updating the governance catalog with the identified policies and rules as being associated with the second application; and based on the updated governance catalog, the computer system cloning the components of the second application or reinstating a clone of the second application.

\* \* \* \* \*